Patented Apr. 19, 1949

2,468,012

UNITED STATES PATENT OFFICE 2,468,012

BETA AMINO PROPIONATES

Arthur F. Isbell, Minneapolis, Minn., assignor to General Mills, Inc., a corporation of Delaware No Drawing. Application August 6, 1945, Serial No. 609,329

8 Claims. (Cl. 260—534)

The present invention relates to novel amino proprionate compounds and to the process of producing the same. More particularly, the invention relates to amino propionates having the general formula $RNHCH_2CH_2COOX$ in which R is a long chain aliphatic group having from 10 to 18 or more carbon atoms, and in which X is selected from the group consisting of hydrogen and salt forming radicals such as alkali metal, or an organic base group such as ammonium, ethanolamine, diethanolamine, triethanolamine, propanolamine, tris - hydroxymethyl - aminomethane and the like. These compounds, in general, are useful as detergents, emulsifying agents, surface active agents, wetting agents, flotation agents, and the like, the particular properties depending on the length of the R group and on the nature of group X. Compounds within this class are useful as detergents, in shampoos, special cosmetic soaps, shaving soaps and the like. These compounds are not precipitated in hard water nor by sea water and accordingly may be used as detergents in such waters. They are useful as laundry soaps, for cleaning dairy equipment, as foam stabilizers, and as flotation agents. In addition, these compounds are not adversely affected by dilute acids and maintain their surface active properties under acid conditions. They may be used, therefore, in the degreasing of metals while the metals are simultaneously subjected to a pickling treatment.

These compounds have the further advantage that they are bacteriostatic and possibly bactericidal. The bacteriostatic properties are observed almost immediately on contact of a solution of these compounds with gram negative organisms, which group includes most of the intestinal pathogens, and the bacteriostatic properties are observed after longer periods of time with gram positive organisms. It is believed that the compounds have bactericidal properties when the period of contact is sufficiently prolonged. It is desired to point out that these bacteriostatic properties are observed in rather dilute solutions, such as would be employed for detergent uses. Accordingly, the bacteriostatic properties would be observed in laundering, washing of eating and cooking utensils and the like, thus making these compounds serve a dual purpose in such applications.

It is, therefore, an object of the present invention to provide novel compounds of the above type possessing properties making them useful as detergents, soaps, emulsifying agents, surface active agents, and the like. It is another object of the present invention to provide a simple process whereby these compounds may be produced.

I have found that compounds of the above type may be produced by the reaction of a primary amine having the requisite number of carbon atoms, with an ester of acrylic acid such as methyl acrylate. The amino propionate ester thus produced may be hydrolyzed to the free acid or may be converted to any of the salts mentioned above.

The condensation between the amine and the acrylic ester proceeds readily without any catalyst, the amine itself being sufficiently basic to catalyze the reaction. The condensation is desirably carried out at a temperature of 25° to 30° C. and since the reaction is exothermic it is usually necessary to cool the reaction mixture to maintain the desired temperature range.

The hydrolysis of the condensation product may be carried out by adding this material slowly to a slight excess of a boiling solution of aqueous alkali and maintaining the resulting mixture at the boiling point with vigorous stirring until a clear solution is formed. The pH of the resulting viscous solution may then be adjusted to any value desired depending on the use to which the compound is to be put. It appears that the best detergent properties are obtained when the amino acid is completely neutralized. Where the base is an alkali metal this may produce a pH of 10–12 whereas when the organic bases heretofore mentioned are used, the completely neutralized acid may have a pH of about 8. The particular use to which the compound is to be put may dictate the pH of the compound used and/or the base used to neutralize the acid.

The following examples will serve to illustrate the invention and are to be considered as illustrative only, and not as limitations theerof.

*Example 1*

185 g. of dodecyl amine (1.0 mole) was heated to 100° C. under vacuum for 10 minutes to decompose any amine carbonate present in the amine. The molten amine was then cooled to 25° C. and while being stirred vigorously, 94.6 g. of methyl acrylate monomer (1.1 moles) was added dropwise, the reaction mixture being cooled with cold water to keep the reaction temperature between 25° C. and 30° C. After all the acrylic ester had been added, the solution was stirred and cooled until the evolution of heat had ceased. After this solution was allowed to stand overnight, a vacuum of 15 mm. was applied and the solution was slowly heated to 60° C. on a water bath to remove the excess methyl acrylate. The residue weighed 271 g.—quantitative yield.

Forty-four grams of sodium hydroxide (1.1 moles) was dissolved in 400 ml. of water and this solution was heated to boiling. To the boiling caustic solution the condensation product above was added in small portions with vigorous stirring, allowing sufficient time between additions for the solution to become clear. Boiling water was added periodically to keep the caustic solution sufficiently fluid until a total of 950 ml. of water had been used. After the last of the condensation product had been added the solution was boiled carefully for ten minutes more to complete the hydrolysis and then concentrated hydrochloric acid was added until the pH had dropped to 8.2. This resulting clear viscous solution acts as an excellent detergent and foaming and wetting agent and a dilute solution of the compound containing 1% or less of solids greatly lowers the surface tension of water.

*Example 2*

69.0 g. of the mixed amines from soybean oil (0.259 mole based on the mean molecular weight of 266) was heated to 100° C. in vacuo for 10 minutes to decompose any amine carbonate. After cooling, 25.0 cc. ether was added to prevent the amine from crystallizing at the reaction temperature and 24.5 g. of methyl acrylate (0.285 mole) was added dropwise while the temperature of the reactants was maintained at 25–30° C. with cooling. Allowing the solution to stand for 12 hours completed the reaction, after which the solution was slowly heated to 60° C. in vacuo to remove the ether and excess methyl acrylate. The oily residue weighed 89.5 g. representing a 98% theoretical yield based on a mean molecular weight of 352 for the expected product.

The methyl ester prepared above was hydrolyzed in the following particularly advantageous manner. The methyl ester was added to 300 cc. of water and the heterogeneous mixture was heated to boiling with vigorous stirring. The external source of heat was removed and 11.4 g. of solid sodium hydroxide in pellet form was added slowly and cautiously to the vigorously stirred hot mixture. The heat of solution and reaction of the sodium hydroxide served to maintain the liquid at the boiling point. Small amounts of boiling water were added occasionally when the mixture became too viscous. After all the alkali had been added the homogeneous solution was heated cautiously at the boiling point for an additional 15 to 30 minutes to complete the hydrolysis. After cooling, sufficient concentrated hydrochloric acid was added to lower the pH to 8.5–9.0. The resulting opaque emulsion became clear on further dilution with water and served as an excellent emulsifying and surface-active agent.

This method of hydrolysis has several advantages. The addition of the solid alkali generates sufficient heat in the form of the heat of solution and the heat of reaction to keep the reaction mixture at a suitable elevated temperature for prompt hydrolysis without any external application of heat. In the previously described hydrolysis where the alkali is added in the form of an aqueous solution, external heat is required, and in view of the viscous nature of the reaction mixture, overheating is likely to occur resulting in partial discoloration of the product. Where the alkali is added as a dry solid, the application of external heat is obviated and a white product results. Moreover, by means of this method it is possible to produce a solution of the hydrolyzed product of high concentration since the amount of water used in the hydrolysis may be maintained at a minimum. This is of value since it is extremely difficult to concentrate dilute solutions of the hydrolyzed product in view of the extreme foaming characteristics thereof.

*Example 3*

To 126.0 g. of decylamine (0.80 mole) 75.6 g. of methyl acrylate (0.88 mole) was added dropwise with good stirring. The reaction temperature was maintained at 25–30° C. by cooling until the reaction had ceased and the solution was then allowed to stand overnight. By heating the solution to 60° C. in vacuo the excess methyl acrylate was removed, leaving 195 g. of residue —theoretical yield.

97.5 g. of the methyl ester above was mixed with 350 cc. of water and heated to boiling. To the hot mixture 17.6 g. of solid sodium hydroxide (pellets) was added at such rate as to keep the mixture just at the boiling point. The mixture soon becomes homogeneous and it was then caused to boil slowly for an additional 30 minutes to complete the hydrolysis. This solution may then be adjusted to any reasonable pH value to give a very excellent surface-active agent.

In addition to the above methods of hydrolysis, it is sometimes advantageous to hydrolyze the ester without the use of alkali. This may be done by means of an acid but preferably by the use of water. When water is used for hydrolysis the beta-amino propionic acid is obtained as such and this method of hydrolysis is a convenient way of obtaining the free acid. If an alkaline hydrolysis is employed and the resultant sodium salt is converted to the acid, it is difficult to isolate the acid since the inorganic material resulting from the acidification of the sodium salt is difficult to remove. This method of hydrolysis is also advantageous where it is desired to produce a salt of an organic base. This may be accomplished by merely adding the organic base to the free acid and obviates all the difficulties which are encountered where it is attempted to convert the sodium salt to the organic base salt. These organic base salts are desirable for use as shampoos and the like since they have a pH nearer neutrality than do the sodium salts.

The amine employed in the condensation should be a primary amine and may vary in the length of the aliphatic chain from 10 to 18, or more, carbon atoms. While all of these compounds are useful as emulsifying agents, and for reduction of surface tension, compounds which are particularly useful for their detergent properties are generally found to have an aliphatic chain length of 10 to 14 carbon atoms. The best detergent properties are observed with an aliphatic chain length of 12. From a commercial standpoint a predominantly $C_{12}$ fraction of the mixed amines derived from coconut oil is particularly satisfactory.

The group X shown in the type formula may likewise be varied quite widely as has been pointed out previously. The nature of this group will likewise have an effect on the properties of the resulting compound as is well understood by those skilled in the art.

While the invention has been described in its various modifications it is to be understood that it is not limited to such modifications but may

I claim as my invention:

1. Process of producing a compound of the formula $RNHCH_2CH_2COOX$ in which R is an aliphatic hydrocarbon group containing from 10 to 18 carbon atoms and X is selected from the group consisting of hydrogen and a salt forming radical, which comprises reacting the amine, $RNH_2$, with an ester of acrylic acid in the absence of a solvent and in the absence of a catalyst to form a beta amino ester, and replacing the ester group with a hydrophilic group.

2. Process of producing a compound of the formula $RNHCH_2CH_2COOX$ in which R is an aliphatic hydrocarbon group containing from 10 to 18 carbon atoms and X is a salt forming radical, which comprises reacting the amine, $RNH_2$, with an ester of acrylic acid in the absence of a solvent and in the absence of a catalyst to form a beta amino ester, and hydrolyzing the beta amino ester with a base to form the salt thereof.

3. Process of producing a compound of the formula $RNHCH_2CH_2COOX$ in which R is an aliphatic hydrocarbon group containing from 10 to 18 carbon atoms and X is a salt forming radical, which comprises reacting the amine, $RNH_2$, with an ester of acrylic acid in the absence of a solvent and in the absence of a catalyst to form a beta amino ester, and hydrolyzing the beta amino ester with an alkali metal hydroxide to form the alkali metal salt thereof.

4. Process of producing a compound of the formula $RNHCH_2CH_2COOX$ in which R is an aliphatic hydrocarbon group containing from 10 to 18 carbon atoms and X is a salt forming radical, which comprises reacting the amine, $RNH_2$, with an ester of acrylic acid in the absence of a solvent and in the absence of a catalyst to form a beta amino ester, and replacing the ester group with an organic base to form the salt thereof.

5. Process of producing a compound of the formula $RNHCH_2CH_2COOX$ in which R is an aliphatic hydrocarbon group containing from 10 to 18 carbon atoms and X is a salt forming radical, which comprises reacting the amine, $RNH_2$, with an ester of acrylic acid in the absence of a solvent and in the absence of a catalyst to form a beta amino ester, hydrolyzing the ester with water to form beta amino proprionic acid and then neutralizing the acid with an organic base to form the salt thereof.

6. Process of producing a compound of the formula $RNHCH_2CH_2COOX$ in which R is an aliphatic hydrocarbon group containing from 10 to 18 carbon atoms, and X is selected from the group consisting of hydrogen and a salt-forming radical, which comprises reacting the amine, $RNH_2$, with an ester of acrylic acid in the absence of a catalyst to form a beta amino ester, and replacing the ester group with a hydrophilic group.

7. Process of producing a compound of the formula $RNHCH_2CH_2COOX$ in which R is an aliphatic hydrocarbon group containing from 10 to 14 carbon atoms, and X is selected from the group consisting of hydrogen and a salt-forming radical, which comprises reacting the amine, $RNH_2$, with an ester of acrylic acid in the absence of a catalyst to form a beta amino ester, and replacing the ester group with a hydrophilic group.

8. Process of producing a compound of the formula $RNHCH_2CH_2COOX$ in which R is an aliphatic hydrocarbon group containing 12 carbon atoms, and X is selected from the group consisting of hydrogen and a salt-forming radical, which comprises reacting the amine, $RNH_2$, with an ester of acrylic acid in the absence of a catalyst to form a beta amino ester, and replacing the ester group with a hydrophilic group.

ARTHUR F. ISBELL.

REFERENCES CITED

The following references are of record in the file of this patent:

UNITED STATES PATENTS

| Number | Name | Date |
| --- | --- | --- |
| 1,992,615 | Hoffman et al. | Feb. 26, 1935 |
| 2,017,537 | Hoffman et al. | Oct. 15, 1935 |
| 2,164,781 | Platz et al. | July 4, 1939 |
| 2,195,974 | Reppe et al. | Apr. 2, 1940 |
| 2,401,429 | Kung | June 4, 1946 |

FOREIGN PATENTS

| Number | Country | Date |
| --- | --- | --- |
| 446,813 | Great Britain | Apr. 21, 1936 |
| 742,358 | France | Apr. 5, 1938 |
| 62,989 | Denmark | Dec. 11, 1944 |

OTHER REFERENCES

Flurscheim, Beilstein (Handbuch der Org. Chem.), vol. 4, p. 404 (1922).